USOO5634983A

United States Patent [19]
Kammeraad

[11] Patent Number: 5,634,983
[45] Date of Patent: Jun. 3, 1997

[54] METHOD FOR SOIL REMEDIATION

[76] Inventor: Norman Kammeraad, 6923 48th Ave. SE., Hudsonville, Mich. 49426

[21] Appl. No.: 147,846

[22] Filed: Nov. 5, 1993

Related U.S. Application Data

[63] Continuation-in-part of Ser. No. 864,568, Apr. 7, 1992, Pat. No. 5,304,704.

[51] Int. Cl.$^6$ ...................................................... B09B 3/00
[52] U.S. Cl. .............................. 134/25.1; 134/26; 134/40; 210/749; 210/909
[58] Field of Search .......................... 134/25.1, 26, 40; 588/249; 405/264, 128; 210/749, 909

[56] References Cited

U.S. PATENT DOCUMENTS

| | | | |
|---|---|---|---|
| 3,779,907 | 12/1973 | Li et al. | 210/22 |
| 4,253,951 | 3/1981 | McCune | 210/749 |
| 4,555,343 | 11/1985 | Bauer et al. | 210/643 |
| 4,599,117 | 7/1986 | Luxemburg | 134/25.1 |
| 4,782,625 | 11/1988 | Gerken et al. | 47/1.42 |
| 4,846,934 | 7/1989 | Carberry | 202/177 |
| 4,927,293 | 5/1990 | Campbell | 405/128 |
| 4,951,417 | 8/1990 | Gerken et al. | 47/1.42 |
| 4,966,654 | 10/1990 | Carberry | 202/177 |
| 4,978,508 | 12/1990 | Hansen et al. | 422/186.08 |
| 4,979,886 | 12/1990 | Rippberger | 422/129 |
| 4,997,313 | 3/1991 | Gibson et al. | 405/128 |
| 5,055,196 | 10/1991 | Darian et al. | 210/638 |
| 5,061,119 | 10/1991 | Balthaus et al. | 405/128 |
| 5,122,194 | 6/1992 | Miller et al. | 134/29 |
| 5,304,704 | 4/1994 | Kammeraad | 588/249 |

OTHER PUBLICATIONS

Material Safety Data Sheet For Control Solve 228, Published Feb. 15, 1991.
Material Safety Data Sheet For Control Solve 228, Published Feb. 15, 1991 (Revised/Corrected).
Bio Solve Product Brochure, Jan., 1, 1991.
Public Acts of 1982, Section 299. 601 Et Seq. of the Michigan Compiled Laws, p. 1, May 21, 1990.
Leaking Underground Storage Tank Act, Act. No. 478, P.A. of 1988 As Amended By Act 150 of 1989.
J. D. Rouse. D. A. Sabatini and J. H. Harwell, Minimizing Surfactant Losses Using Twin–Head Anionic Surfactants In Subsurface Remediation, 1993 copyright.

*Primary Examiner*—Jill Warden
*Attorney, Agent, or Firm*—Young & Basile P.C.

[57] ABSTRACT

A process of soil remediation in which an encapsulation solution is introduced into contact with a soil matrix containing chemical contaminants such as polynucleated aromatics chloronated hydrocarbons and the like in an amount sufficient to form a saturated admixture of the soil matrix and the encapsulation solution, the encapsulation solution being capable of preferentially attracting the chemical contaminants contained in the soil matrix, and containing an effective amount of non-ionic surfactant material, an anionic surfactant material and water; and the admixture is admixed for an interval sufficient to permit the chemical contaminants to preferentially dissociate from contact with the soil matrix in favor of association with the encapsulation solution and at least one carbon bond in the chemical contaminant to be broken as a result of interaction between the non-ionic surfactant material and the contaminant. Once this occurs, a major portion of the encapsulation solution with associated chemical contaminants can be removed from contact with the soil matrix.

24 Claims, 2 Drawing Sheets

METHOD FOR SOIL REMEDIATION

FIELD OF THE INVENTION

This is application is a continuation-in-part of U.S. Ser. No. 07/864,568 filed on Apr. 7, 1992 which is now U.S. Pat. No. 5,304,704.

The present invention relates to chemical remediation. More specifically, the present invention pertains to a method and apparatus which can be employed to reduce or eliminate undesirable chemical contaminants from fluidizable matrices such as soil by bioencapsulation of at least a portion of the contaminants and chemically straining or breaking chemical bonds present in the contaminates rendering them amenable to subsequent chemical, environmental and biological degradation.

BACKGROUND OF THE INVENTION

In the past two decades, the problem of soil contamination has been recognized as being pronounced, extensive and acute; both in the United States and abroad. Clean-up of both accidentally and intentionally contaminated soil has been mandated by federal, state, and local governments. The complexity of the task of soil remediation is compounded by the wide variation among contaminated sites. It cannot be guaranteed that any two clean-up sites will contain soil having the same characteristics; be exposed to similar climatic or geological conditions; or even have similar chemical contaminants present at even roughly the same concentrations. Wide variations can occur from site to site or even from location to location within the same clean-up site.

Thus the methodology for each clean-up effort must be specifically designed to meet the conditions found at the given site. Various processing methods implemented in the past have met with limited success. Volatile or volatilizable contaminants can be removed by a variety of reactive or evaporative processes. These processes generally entail the use of absorbent and/or oxidizing reactant materials which react with volatile or volatilizable organics to form reaction by-products which are more environmentally acceptable than the original contaminants. Such systems generally entail heating the soil matrix or subjecting it to other physical procedures to volatilize the contaminants to remove them from the soil matrix.

Many chemical contaminants are not readily volatilizable and therefore are not amenable to the reactive and/or evaporative processes as previously described. These contaminants include, but are not limited to halogenated aliphatics and various substituted and non-substituted poly-and mono-aromatic hydrocarbons; for example, polyhalogenated biphenyls and the like. Irradiation of contaminated solid material such as soil has been proposed as a method for reducing certain specific contaminants; for example polyhalogenated biphenyls such as PBB and PCB. However, such procedures are costly and time consuming. Such treatment methods are of limited use for use in soil matrices containing high concentrations of a wide variety of contaminants.

Extraction processes have been proposed to remove chemical contaminants from soil and sludge. Such methods generally involve contacting water wet soil/sludge with suitable water-insoluble solvents in which the chemical contaminants are preferentially soluble. The solvent containing the contaminants are separated from the solid after which the solvent and contaminants may then be separated from one another and a suitable post-treatment process.

Because no universally effective remediation method has been proposed, on-site soil remediation has been essentially impossible in many cases. Clean-up and remediation efforts up to the present have concentrated on removal of contaminated soil from the site to either secure containment landfills or to incineration facilities. This is both expensive and sacrifices productive topsoil which, if remediated, could possibly support vegetative growth.

It would be highly desirable to provide a remediation method which could be employed effectively with a variety of different contaminated matrices such as water, soil, bio-solids, and the like to remove a variety of classes of chemical contaminants. It is also desirable to provide a process in which chemical contaminants, particularly any which may remain in the soil as post-treatment residue are rendered amenable to further chemical, biological or environmental degradation. It is also desirable that the contaminant removal process be one which can be accomplished in a continuous manner at or near the clean-up site. Furthermore it is desirable that the remediation process be one which is capable of reducing the level of contaminants present in various matrices, particularly in soil to a level below that which is mandated in the applicable environmental regulations, with reduction in contaminant concentrations to levels below current detection limits being highly desirable.

SUMMARY OF THE INVENTION

The present invention is a process and device for remediation either on or near the source of the contaminated matrix material or at locations remote therefrom in which significant portions of various organic compounds classified as target chemical contaminants can be removed from association with the matrix in a manner which ultimately is capable of reducing the concentration of these target organic contaminants to levels at or below those mandated by the applicable state, local, or federal environmental regulatory agencies. If desired, the process of the present invention can be employed to reduce the levels of target chemical contaminants to levels below the detection limits of analytical instruments currently employed.

The contaminated matrix may be a liquid material, such as underground or above-ground water, or fluidizable solid materials such as soil, bio-solids and the like. While the remediation process of the present invention is described in particular as it relates to soil processing, it is to be understood that the process of the present invention may be successfully employed on other fluid or fluidizable contaminated media such as bio-solids, water and the like.

In the remediation process of the present invention, a quantity of an encapsulation solution sufficient to saturate the matrix to be treated is brought into contact with material containing targeted chemical contaminants. The encapsulation solution employed is capable of preferentially attracting the target chemical contaminants contained in the matrix, isolating a significant portion of the target chemical contaminants therefrom, and rendering both the isolated contaminants and the non-isolated contaminants amenable to decompositional processes. The decompositional process may be subsequent chemical processes, biodegradation, and environmental degradation either independently or in any combination thereof. The encapsulation solution employed in the remediation process consists essentially of a non-ionic surfactant material employed alone, or preferably, in combination with a sequestering agent such as an anionic, cationic and/or amphoteric surfactant material.

It is believed that the encapsulation solution employed in the remediation process of the present invention performs its function, at least in part, by chemically straining or breaking bonds present in the target chemical contaminates, or between the target chemical contaminants and the contaminated matrix, rendering the target chemical contaminants amenable to subsequent chemical, environment and biological degradation or bioencapsulation.

In the preferred embodiment, the admixture resulting from combining contaminated matrix and encapsulation solution is agitated for an interval sufficient to permit ultimate contact between the encapsulation solution and the target chemical contaminants to preferentially dissociate the target chemical contaminants from contact with the matrix in favor of association with the encapsulation solution. Major portions of the encapsulation solution with target chemical contaminants associated therewith can be removed from contact with the matrix, yielding a treated matrix which is essentially free of target chemical contaminants.

The soil remediation device of the present invention comprises a mixing hopper having at least one pair of counter-rotating mixing blades mounted therein. In the preferred embodiment, a shredding pug milling device is employed. The device of the present invention also has suitable means for soil introduction and means for introducing encapsulation solution into the mixing hopper associated therewith.

DESCRIPTION OF THE DRAWING

Throughout the description reference is made to the following drawing figures in which like reference numerals refer to the respective elements throughout the various views and in which.

BRIEF DESCRIPTION OF THE PREFERRED EMBODIMENT

Figure 1:
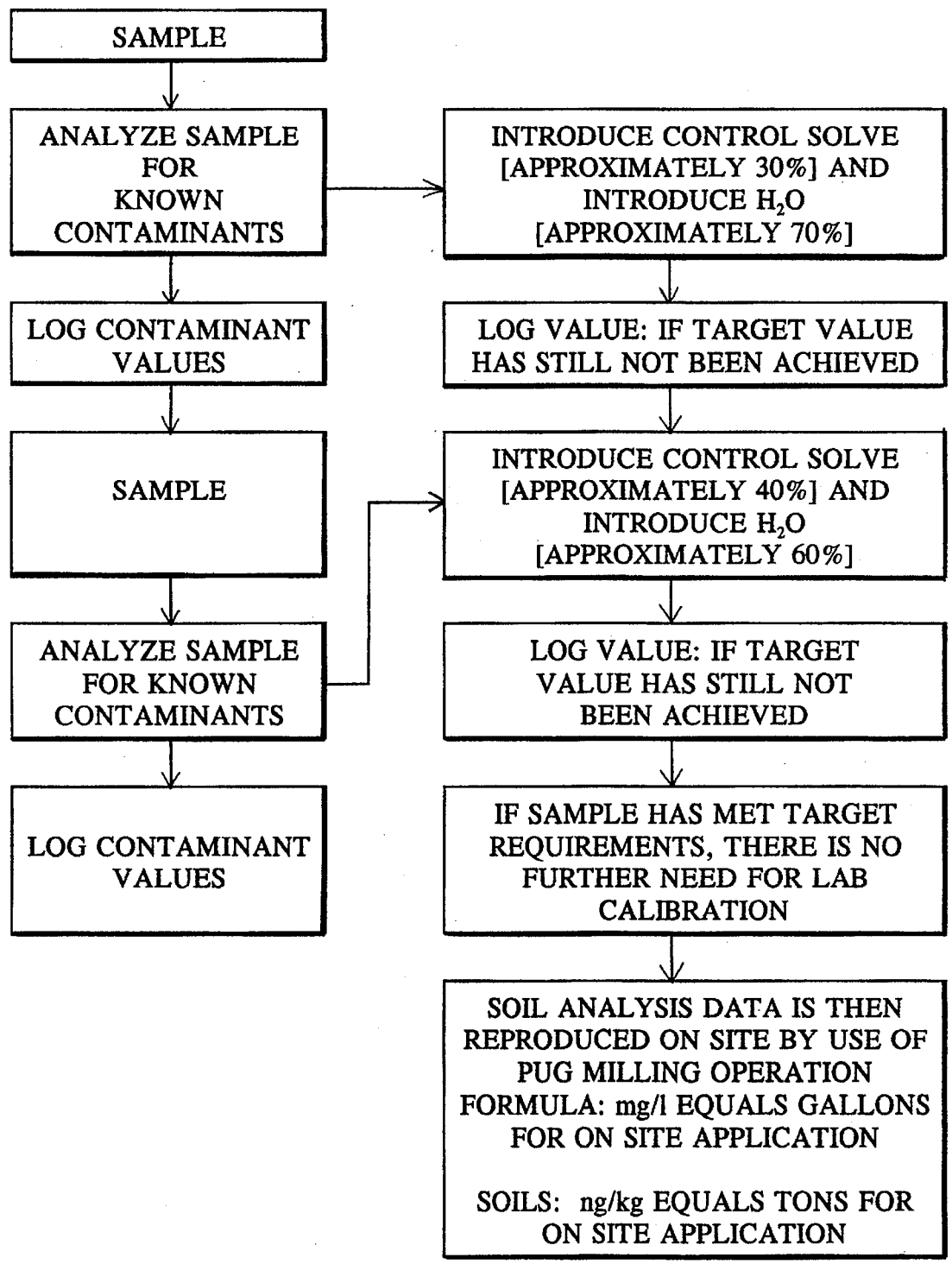
FIG. 1 is a schematic flow diagram of the process of the present invention.

The present invention is predicated on the discovery that various formulations consisting essentially of non-ionic surfactant, a sequestering agent such as an anionic surfactant material and water effectively reduce or eliminate significant concentrations of chemical contaminants present in various matrices. The matrices which can be successfully treated in the process of the present invention can be either fluids, such as water, or fluidizable materials such as soil. Heretofore, it was widely held that such surfactant compositions were effective only for fire- control and small-scale surface spill control and containment but were largely ineffective on deep, permeated contaminant materials.

The present invention is a process and apparatus for on-site or remote remediation in which large quantities of contaminated matrix are contacted with sufficient quantities of a suitable encapsulation solution to provide ultimate contact between the matrix and the solution. The encapsulation solution consists essentially of a non-ionic surfactant material either alone or in combination with a distinct sequestering agent component such as an anionic surfactant material and/or amphoteric in water. The sequestering agent component employed is one capable of preferentially dissociating target chemical contaminants from interaction with the matrix and bonding the contaminants to constituents in the encapsulation solution. The bonding which takes place may be either chemical or physical interaction between the two materials. Such bonding renders the contaminants particularly amenable to interaction with the non-ionic surfactant material present in the encapsulation which ultimately yields compounds which are non-hazardous in nature. The interaction can be either chemical bonds in the chemical contaminants or can be a more physical or chemical/physical interaction in which chemical bonds are strained such that the strained chemical bonds are readily broken by subsequent environmental interaction such as that which would occur due to naturally occurring UV radiation or the action of biological microbes.

The matrix to be treated can be any material which is either a fluid such as water or fluidizable such as various soils, bio-solids and the like. For purposes of discussion herein the matrix treated is soil.

In the preferred embodiment, the encapsulation solution is introduced into contact with the soil to be treated in a manner which insures intimate contact between the two materials. After contact is complete, a major portion of the encapsulation solution containing at least a portion of the target chemical contaminants can be removed by any suitable means and the remediated soil reinstalled in the desired location. A portion of the encapsulation solution may remain in the soil matrix after reinstallation to continue to act on contaminants in situ.

The encapsulation solution employed in the process of the present invention can either contain a non-ionic surfactant material alone or in combination with a suitable sequestering agent component. In the preferred embodiment, the encapsulation solution is an aqueous material containing sufficient concentrations of a sequestering agent component sufficient to interact with the targeted chemical contaminants and preferentially dissociate the same from contact with the soil matrix together with a non-ionic surfactant or mixture of surfactants capable of interacting with the targeted chemical contaminants in a manner which results in the breakage of at least one chemical bond in the targeted contaminant.

The non-ionic surfactant material successfully employed herein is a compound or compound complex essentially insoluble in water which is readily dispersible therein. In the preferred embodiment, the non-ionic surfactant is a material which is capable of forming a stable emulsion or emulsion-like state in water.

Suitable non-ionic surfactants include materials having an HLB (Hydrophile-Lipophile Balance; the relative simultaneous attraction of an emulsifier for two phases of an emulsion system) value between about 0 and about 13.5, with values between about 3.5 and about 20.0 being preferred. The non-ionic surfactants advantageously employed herein are generally polyoxyethylene esters of higher fatty acid having from about 8 to 22 carbon atoms in the acyl group and from about 8 to 30 ethenoxy unit in the oxyethylene portion. Typical products are polyoxyethylene adducts of tall oil, rosin acid, stearic and oleic acids, materials derived from vegetative fatty oils such as cashew oil, almond oil and the like. Additional non-ionic surfactants are the polyoxyethylene condensates of higher fatty acid amines and amides having from about 8 to 22 carbon atoms in the fatty alkyl or acyl group and about 10 to 30 ethenoxy units in the oxyethylene portion. Illustrative products are plant or animal, such as cashew fatty acid amines and amides condensed with about 10 to 30 moles of ethylene oxide.

Further suitable non-ionic surfactants which are advantageously employed in the encapsulation solution of the present invention are generally the polyoxyalkylene adducts of hydrophobic bases wherein the oxygen/carbon atom ratio in the oxyalkylene portion of the molecule is greater than 0.40. Those compositions which are condensed with hydrophobic bases to provide a polyoxyalkylene portion having an oxygen/carbon atom ratio greater than 0.40 include ethylene oxide, butadiene dioxide and glycidol mixtures of these alkylene oxides with each other and with minor amounts of propylene oxide, butylene oxide, amylene oxide, styrene oxide, and other higher molecular weight alkylene oxides. Ethylene oxide, for example, is condensed with the hydrophobic base in an amount sufficient to impart water dispersibility or solubility and surface active properties to the molecule being prepared. The exact amount of ethylene oxide condensed with the hydrophobic base will depend upon the chemical characteristics of the base employed and is readily apparent to those of ordinary skill in the art relating to the synthesis of oxyalkylene surfactant condensates.

Typical hydrophobic bases which can be condensed with ethylene oxide in order to prepare nonionic surfactants include mono- and polyalkyl phenols, polyoxypropylene condensed with a base having from about 1 to 6 carbon atoms and at least one reactive hydrogen atom, fatty acids, fatty amines, fatty amides and fatty alcohols. The hydrocarbon ethers such as the benzyl or lower alkyl ether of the polyoxyethylene surfactant condensates are also advantageously employed in the compositions of the invention.

Among the suitable non-ionic surfactants are the polyoxyethylene condensates of alkyl phenols having from about 6 to 20 carbon atoms in the alkyl portion and from about 5 to 30 ethenoxy groups in the polyoxyethylene radical. The alkyl substituent of the aromatic nucleus may be octyl, diamyl, n-dodecyl, polymerized propylene such as propylene tetramer and trimer, isoctyl, nonyl, etc. The benzyl ethers of the polyoxyethylene condensates of monoalkyl phenols impart good properties of the compositions of the invention and a typical product corresponds to the formula:

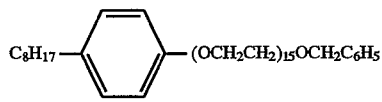

Higher polyalkyl oxyethylated phenols corresponding to the formula:

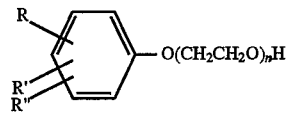

wherein R is hydrogen or an alkyl radical having from about 1 to 12 carbon atoms, R' and R" are alkyl radicals having from about 6 to 16 carbon atoms and n has a value from about 10 to 40, are also suitable as non-ionic surfactants. A typical oxyethylated polyalkyl phenol is dinonyl phenol condensed with 14 moles of ethylene oxide.

Other suitable non-ionic surfactants are cogeneric mixtures of conjugated polyoxyalkylene compounds containing in their structure at least one hydrophobic oxyalkylene chain in which the oxygen/carbon atom ratio does not exceed 0.40 and at least one hydrophilic oxyalkylene chain in which the oxygen/carbon atom ratio is greater than 0.40.

Polymers of oxyalkylene groups obtained from propylene oxide, butylene oxide, amylene oxide, styrene oxide, mixtures of such oxyalkylene groups with each other and with minor amounts of polyoxyalkylene groups obtained from ethylene oxide, butadiene dioxide, and glycidol are illustrative of hydrophobic oxyalkylene chains having an oxygen/carbon atom ratio not exceeding 0.40. Polymers of oxyalkylene groups obtained from ethylene oxide, butadiene dioxide, glycidol, mixtures of such oxyalkylene groups with each other and with minor amounts of oxyalkylene groups obtained from propylene oxide, butylene oxide, amylene oxide and styrene oxide are illustrative of hydrophilic oxyalkylene chains having an oxygen/carbon atom ratio greater than 0.40.

Other suitable polyoxyalkylene non-ionic surfactants are the alkylene oxide adducts of higher aliphatic alcohols and thioalcohols having from about 8 to 22 carbon atoms in the aliphatic portion and about 3 to 50 oxyalkylene portion. Typical products are synthetic fatty alcohols, such as n-decyl, n-undecyl, n-dodecyl, n-tridecyl, n-tetradecyl, n-hexadecyl, n-oxtadecyl and mixtures thereof condensed with 3 to 50 moles of ethylene oxide, a mixture of normal fatty alcohols condensed with 8 to 20 moles of ethylene oxide and capped with benzyl halide or an alkyl halide, a mixture of normal fatty alcohols condensed with 10 to 30 moles of a mixture of ethylene and propylene oxides, a mixture of several fatty alcohols condensed sequentially with 2 to 20 moles of ethylene oxide and 3 to 10 moles of propylene oxide, in either order; or a mixture of normal fatty alcohols condensed with a mixture of propylene and ethylene oxides, in which the oxygen/carbon atom ratio is less than 0.40 followed by a mixture of propylene and ethylene oxides in which the oxygen/carbon atom ratio is greater than 0.40 followed by a mixture of propylene and ethylene oxides in which the oxygen/carbon atom ratio is greater than 0.40 or a linear secondary alcohol condensed with 3 to 30 moles of ethylene oxide, or a linear secondary alcohol condensed with a mixture of propylene and ethylene oxides, or a linear secondary alcohol condensed with a mixture of ethylene, propylene, and higher alkylene oxides.

When employed independent of anionic surfactants, the preferred non-ionic surfactant materials are non-ionic surfactants containing no alcohols or glycols which contains fatty acid and fatty acid derivatives. Such compounds, as noted, are well known and commercially available as spill containment media, such as that sold by S & S Company of Georgia, Inc. under the tradename CONTROL SOLVE. The material is a proprietary emulsion having the characteristics outlined in Table I.

TABLE I

| Typical Properties of CONTROL SOLVE 228 | |
|---|---|
| Boiling Point (at 760 mm Hg) | 200° F. |
| Specific Gravity ($H_2O = 1$) | 1.0 |
| Volatile Content (% by volume) | 3.0 |
| pH | 7 |
| Appearance | Milky white emulsion |

The non-ionic surfactant material, CONTROL SOLVE, is commonly used for spill abatement and control, particularly on solid surfaces such as concrete. The material is commercially available in either an aqueous concentrate, a premixed use solution, or in its non-aqueous form under the trade designations the encapsulation solution CONTROL SOLVE 114, CONTROL SOLVE 228, and CONTROL SOLVE 111, respectively. In the preferred embodiment of the present invention, premixed use solutions are employed. However, either aqueous concentrate or non-aqueous material can be successfully employed in the encapsulation solution of the present invention as a source of appropriate non-ionic surfactant material.

When employed independent of anionic surfactant material, the concentration of non-ionic surfactant in the encapsulation solution is that amount sufficient to interact with the major portion of target chemical contaminants to dissociate these materials from the soil matrix and render them amenable to sequestration and/or decomposition. It is to be appreciated that the optimum concentration of non-ionic surfactant will vary depending upon the level of soil contamination encountered. The concentration of non-ionic surfactant will be that amount sufficient to economically treat the major portion of the targeted chemical contaminants. The term "major portion" as used herein is defined as that amount of a given chemical contaminant which when treated will yield a contaminant concentration level below a predetermined or set value. This value may be derived from experimental data or may be one set by regulatory agencies such as the United States Environmental Protection Agency. It is also possible to further reduce chemical contaminant concentrations to levels below the limits of detection possible with current analytical methods. Such reduction would be readily ascertainable given the disclosure of the present invention.

While the concentration of non-ionic surfactant employed in the encapsulation solution of the present invention can be adjusted to treat various levels of chemical contaminant concentration, the non-ionic surfactant is generally present in an amount between about 2 and about 25.0% by total composition volume, with amounts between about 2.0 and about 10.0% by volume being preferred.

In the preferred embodiment, the non-ionic surfactant component is employed in combination with a sequestering agent such as an anionic surfactant. It has been found, quite unexpectedly, that when employed in combination, the anionic surfactant component provides enhanced sequestration properties while the non-ionic surfactant component actually interacts with the targeted chemical contaminants to break or weaken chemical bonds resulting in the ultimate conversion of the chemical contaminants to non-hazardous material.

The sequestering agent component employed in the encapsulation solution is a compound or compound complex which is essentially insoluble in water but which can be readily dispersed therein. Additionally, the sequestering agent component is a compound or mixture of compounds which facilitates the ready dispersal of the non-ionic surfactant material and targeted chemical contaminants in water. In the preferred embodiment, the sequestering agent component is a combination of an anionic surfactant and an amphoteric surfactant. The anionic surfactant material of choice can be either a sulfate, ether sulfate, anionic sulfonate, phosphate ester, fatty acid carbocylate, sulfosuccinate, or anionic alkyl phenol ethoxylate with an anionic surfactant selected from the group consisting of sulfonates of ethoxylated linear alcohols, alkyl benzone sulfonates, alkyl sulfonates, alkyl aryl sulfonates, napthalene sulfonates, alpha olefin sulfonates and mixtures thereof being preferred.

The sulfonates of ethoxylated linear alcohols which can be employed in the present invention have the general formula:

R—(OCH$_2$CH$_2$)$_n$SO$_3$M wherein μ is an integer between 1 and about 5 and M is selected from the group consisting of alkali metal cations, amine cations, ammonium cations and mixtures thereof. Representative of the useful alkali metal cations are sodium, potassium, as well as mixtures thereof.

The alkyl sulfonates which can be employed in the present invention include those having the general formula:

CH$_3$(CH$_2$)$_n$SO$_3$M wherein n is an integer between about 6 and about 12 and M is selected from the group consisting of alkali metal cations, amine cations, ammonium cations and mixtures thereof.

The alkyl aryl sulfonates which can be employed in the present invention include those having the general formula:

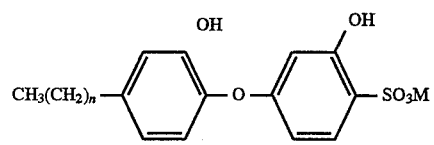

wherein n is an integer between about 6 and about 12 and M is an anion selected from the group consisting of alkali metal cations, amine cations, ammonium cations and mixtures thereof.

The napthalene sulfonates which can be employed in the present invention have the general formula:

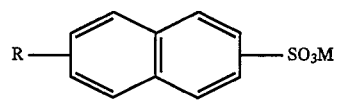

wherein R is a hydrocarbon radical having between 8 and 10 carbon atoms and M is an anion selected from the group consisting of alkali metal cations, amine cations, ammonium cations and mixtures thereof.

Alpha-olefin sulfonates which can be employed in the present invention have the general formula:

RCH=CH—CH$_2$—SO$_3$M wherein M is selected from the group consisting of alkali metal cations, amine cations, ammonium cation or mixtures thereof and R is a hydrocarbon radical having between 9 and 15 carbon atoms.

Alkyl benzene sulfonates are preferably employed as the anionic surfactant in the encapsulation solution of the present invention. Where alkyl benzene sulfonates are employed, they are, preferably, selected from the group consisting of alkyl benzene sulfonates having 8 to 14 carbon atoms in an essentially linear; i.e. unbranched alkyl chain being preferred. The amount of branching permissible in the alkyl side chain is to be determined by the degree of biodegradability desired in the anionic surfactant. As can be readily appreciated "soft" (biodegradable) material is preferred to "harder" compounds in this application as the aspect of biodegradability is important for any material in the encapsulation solution which may remain in the soil matrix after treatment.

In the preferred embodiment, the alkyl benzene sulfonate may be defined as a linear alkylate sulfonate which is derived from the sulfonation of a blend of isomeric benzenes (primarily monoalkyl) with saturated side chains averaging 12 carbon atoms commonly known as detergent alkylate to form dodecyl benzene sulfonate. The sulfonate employed preferably is a cationic salt in which is selected from the group consisting of alkali metals, amine cations, ammonium cations and mixtures thereof. In practicing this invention, the preferred cation being an amine selected from the group consisting of isopropyl amine, trimethyl amine, t-buty amine, methyl amine, and mixtures thereof, with isopropyl amine being preferred.

When the encapsulation solution contains a non-ionic surfactant component in combination with an anionic surfactant, the non-ionic surfactant is generally present in an amount between about 2.0 and about 95% by total composition volume, with amounts between about 2.0 and about 10.0% being preferred with amounts between about 2.0 and about 10% by volume being most preferred. The anionic surfactant component is present in an amount between about 2.0 and about 95.0% by total composition volume, with amounts between about 2.0 and about 40% being preferred.

The sequestering agent component of the present invention can also contain an amphoteric surfactant material employed either in combination with or as a substitute for the anionic surfactant material. The amphoteric surfactant material can be either betaines, sultaines, glycinates, amino propionates, amphocarbocylates, or amphoteric sulfonates. In the preferred amphoteric surfactant material is selected from the group consisting of amphocarboxylate salts having between 2 and 12 carbon atoms in the carboxylate group, amphodicarboxylate salts having between 2 and 12 carbon atoms in the carboxylate group, amphoteric condensation products of carboxylic acids having 2 to 12 carbon atoms in each carboxylic acid group, betaines and mixtures thereof with sodium, potassium or ammonium salts being preferred.

Amphocarboxylate salts suitable for use in the present invention are selected from the group consisting of cocoamphoacetate salts, cocoamphopropionate salts, stearoamphoacetate salts, capryloamphopropionate salts, butoxyethoxy acetate salts, and mixtures thereof, with an amphocarboxylate salt selected from the group consisting of p alkyldlimethyl betaines with alkyl groups having between 2 and 8 carbon atoms being preferred. Suitable amphoteric condensation products of carboxylic acids for use in the present invention are selected from the group consisting of cocamphodiacetate salts, cocamphodipropionate salts, capryloamphodiacetate salts, capryloamphodipropionate salts, tallamphodipropionate salts, lavroamphodiacetate salts, organo-alkaloid complexes of plant-derived origin exhibiting high water solubility. The organo-alkaloid is selected from the group consisting of amino alkyl betaines having between 2 and 5 carbon atoms in the alkyl group. In the preferred embodiment, a betaine selected from the group consisting of cocamidopropyl betaine, amidoalkyl sultaines, amidoalkyl glycinates, and mixtures thereof is employed.

Without being bound to any theory, it is believed that the presence of the amphoteric surfactant provides a complementary interaction with the non-ionic surfactant component which permits degradative interaction by the non-ionic surfactant on the target contaminant. In the encapsulation solution of the preferred embodiment, the amphoteric surfactant is present in an amount between about 2.0 and about 95.0% of the total composition volume with an amount between 2.0 and 40.0% being preferred when the amphoteric surfactant is employed in combination with an anionic surfactant.

The sequestering agent component of the present invention can also include a surface active agent exhibiting cationic characteristics. Suitable cationic surfactants can include amine oxides, imadazoles, benzyl quaternerys and/or alkyl quaternerys.

In preparing the encapsulation solution of the present invention an admixture of anionic surfactants and alkaloids can be formulated with additional non-ionic surfactants and additional water to prepare the composition of the present invention. A suitable anionic surfactant admixture is commercially available under the tradename DYNA-SOLVE from Allmond Laboratory Services of Albany, Ga. The material is a proprietary emulsion containing a naturally derived alkaloid amphoteric surfactant, an anionic surfactant and minor amounts of a non-ionic surfactant typically employed as petroleum dispersant and emulsifier having the characteristics outlined in Table II.

TABLE II

| TYPICAL PROPERTIES OF DYNA-SOLVE | |
| --- | --- |
| Boiling Point | 149° C. |
| Specific Gravity ($H_2O = 1$) | 1.02 at 25°/25 atm |
| Volatile Content (% by volume) | 5% |
| pH | 6.0 to 8.0 |
| Appearance | Clear amber viscous liquid |

The encapsulation solution of the present invention also can contain sufficient quantities of a suitable organic solvent to permit dispersion of the fluidizable matrix such as soil in the encapsulation solution and to improve the flow characteristics of matrix/encapsulation solution complex during processing. The organic solvent is, preferably, selected from the group consisting of butyl cellosolve, methyl cellosolve, ethylcellosolve, ethylene glycol monobutyl ethers and their derivatives and mixtures thereof in an amount between about 0.1% and 50.0% of the total encapsulation solution. In the preferred embodiment, butyl cellosolve in an amount between 1.0 and 30.0% is preferred.

The concentration of non-ionic surfactant in the encapsulation solution of the preferred embodiment is that amount sufficient to interact with the major portion of target chemical contaminants to render these materials amenable to sequestration and/or decomposition. It is to be appreciated that the optimum concentration of non-ionic surfactant will vary depending upon the level of soil contamination encountered. The concentration of non-ionic surfactant will be that amount sufficient to economically treat the major portion of the targeted chemical contaminants. The term "major portion" as used herein is defined as that amount of a given chemical contaminant which when treated will yield a contaminant concentration level below a predetermined or set value. This value may be derived from experimental data or may be one set by regulatory agencies such as the United States Environmental Protection Agency. It is also possible to further reduce chemical contaminant concentrations to levels below the limits of detection possible with current analytical methods. In other words, chemical contaminants in the untreated soil matrix are present in the matrix at a first concentration level. The concentration of surfactant will be that amount sufficient to treat the targeted chemical contaminants, i.e. reduce the chemical contaminant concentration from the first concentration level to a second concentration level lower than the first level. Such reduction would be readily ascertainable given the disclosure of the present invention.

While the concentration of non-ionic surfactant employed in the encapsulation solution of the present invention can be adjusted to treat various levels of chemical contaminant concentration, the non-ionic surfactant is generally present in an amount between about 2 and about 25.0% by total composition volume, with amounts between about 2.0 and about 10.0% by volume being preferred.

In order to ascertain a more specific concentration of non-ionic surfactant in the encapsulation solution of the present invention, attention is directed to the calibration steps of the present invention which are described in detail subsequently.

The non-ionic surfactant is maintained in a suitable aqueous carrier medium. The aqueous carrier medium envisioned herein is water which is essentially free of organic and inorganic chemical contaminants which would interfere with the remediation process of the present invention. In the preferred embodiment, water which has been deionized and distilled by conventional procedures is sufficiently free of chemical contaminants for purposes of the present invention.

The encapsulation solution of the present invention may be admixed in advance of application and stored in suitable vessels until needed. However, due to the variable nature of chemical contaminants in soil matrices, it is preferred that the encapsulation solution be prepared immediately prior to application with a non- ionic surfactant present in an amount which corresponds with the results obtained in the calibration step of the present invention. The calibration step will be described in greater detail subsequently.

While it is anticipated that the encapsulation solution and the soil remediation method of the present invention can be efficaciously employed to treat and remove a variety of chemical contaminants, it is anticipated that the process of the present invention is most advantageously employed to remove and render harmless certain chemical compounds which for purposes of this discussion will be classified as hazardous as defined by the United States Environmental Protection Agency under subtitle C of the Resource Conservation and Recovery Act of 1976; i.e. having a flash point greater than 140° F. More specifically, these materials include halogenated hydrocarbons as well as polyaromatic and monoaromatic hydrocarbons. As defined herein, the term "polyaromatic and monoaromatic hydrocarbon" is broadly defined as substituted and unsubstituted cyclical hydrocarbons having at least one napthenic or phenolic functionality associated therewith. Chemical contaminants which are specifically targeted for treatment by the process of the present invention include, but are not limited to organic compounds selected from the group consisting of polyhalogenated biphenyls, napthalene, acenapthalene, acenapthene, fluorene, phenanthrene, anthracene, fluoranthene, pyrene, benz(a)anthracene, chrysene, benzo(b) fluoranthene, benzo(k)fluoranthene, benzo(a)pyrene, indeno (1,2,3-cd) pyrene, dibenz(a,h)anthracene, benzo(g,h,i) perylene, polychloronated biphenyls, polybiominated piphenyls and mixtures thereof. The term "halogenated hydrocarbon" as employed herein is defined as saturated or unsaturated branched or unbranched hydrocarbons having at least one halogen substituted thereon and having between two and 30 carbon atoms with two and 10 carbon atoms being preferred. The halogen group can be selected from the group consisting of fluorine, chlorine, iodine and mixtures thereof. Chemical contaminants which can be efficaciously treated by the method of the present invention employing the anionic/nonionic encapsulation solution include, but are not limited to organic compounds selected from the group consisting of chloronated hydrocarbons such as trichloroethylene, trichloroethane, tetrachloroethane, chloroform, methylene chloride, 1,1 dichloroethane, 1,3 dichloropropane, dichlorobenzene; fluorocarbons such as chlorodifluoromethane, 1,1,2 tetrafluoroethane; chlorofluorocarbons such as dichlorodifluoromethane, and mixtures thereof.

The process of the present invention is preferably a multistage method in which soil material to be treated is lifted from its original location by any conventional means such as a mechanical back hoe or the like and transported directly to the treatment device or to a suitable first stage pretreatment holding area where it can be directed into the treatment device as required. The soil to be treated can be any suitable soil, coarse sand, humus, clay-like or loam-like material. Optionally, prior to introduction into the treatment device, the soil material can be tilled or worked to break or shred large clods, if desired.

The soil to be treated is introduced in a continuous manner into a suitable mixing device such as a pug milling apparatus where it can be brought into contact with encapsulation solution containing specific amounts of non-ionic surfactant necessary to treat the concentration of chemical contaminants found in that particular soil matrix. The total volume of encapsulation solution employed is that amount sufficient to saturate the soil volume to be treated. As used herein the term "saturation" is defined as the amount of encapsulation solution which must be added to a given soil volume to yield an excess or run-off amount of encapsulation solution between about 25% and about 50% of the total soil volume per hour after 20 minutes of mixing. The material is mixed and macerated to ensure ultimate contact with the encapsulation solution.

Without being bound to any theory, it is believed that saturation with encapsulation solution not only insures that sufficient amounts of the active ingredients in the encapsulation solution are delivered to the soil sample; saturation also provides intimate contact of the soil matrix to which the chemical contaminants adhere with sufficient encapsulation solution to permit the preferential bonding between the contaminant compounds and with the surfactant portion of the encapsulation solution. Finally, it is also believed that copious amounts of encapsulation solution assist in preventing the reattachment of the contaminant compound to the soil matrix as well as providing a suitable carrier medium for removal of at least a portion of the chemical contaminants which have become entrained in the encapsulation solution during processing.

It is also believed that components in the anionic/nonionic encapsulation solution of the present invention interact and react with target chemical contaminants resulting in the breaking or severing of at least one chemical bond in the target chemical contaminant. This results in a reconfiguration of the chemical molecule rendering it more amenable to solubilization, and/or chemical breakdown to non-hazardous products or intermediary compounds which are amenable to action by biological agents, environmental forces or the like.

The interval during which the encapsulation solution and the soil matrix being treated are mixed is one which is sufficient to facilitate encapsulation of a major portion of the targeted chemical contaminants to be treated and/or removed from the soil matrix. This interval can vary depending on the characteristics of the soil matrix to be treated, the concentration and type of contaminant present, and the overall removal effectiveness desired. In the preferred embodiment, mixing occurs for an interval sufficient to thoroughly saturate the soil matrix and form the slurry. In the preferred embodiment, mixing intervals between about 30 seconds to about 10 minutes are anticipated; with mixing intervals between about 1 and about 5 minutes being preferred.

Thorough mixture of the solution saturated soil is necessary to insure that intimate contact between the active encapsulation solution and all of the surfaces of the soil matrix has been achieved. Mixture can be accomplished by any of a variety of methods such as vibration, shredding, agitation and the like. The method of choice will preferably reduce the volume and number of any clumps or agglomerations of soil particles and help prevent their reformation during mixture. In the preferred embodiment, a macerative process is employed in which the soil-solution mixture is shearingly agitated by at least one suitably configured shearing blade. Admixture of the soil and encapsulation solution is most effectively accomplished by at least one pair of counter-rotating mixing blades and/or pug milling device which operate on the soil-solution mixture in the manner found in a pug milling process. Excess encapsulation solution can be removed from contact with the soil matrix after mixing is completed. This can occur immediately after mixing is completed or after a first contact interval of about 2 to 20 minutes, with a contact interval of 5 to 10 minutes being preferred. The contact interval is that which is sufficient to permit reaction between a major portion of the chemical contaminants and the components of the encapsulation solution.

In the process of the present invention, the initial contact interval terminates with the separation of the excess encapsulation solution from the soil matrix. Separation may occur at any time subsequent to mixing. In the preferred embodiment, separation occurs immediately prior to discharge from the mixing device. However, it is anticipated that the encapsulation solution may be removed in separate processing devices if desired. Separation and removal of excess encapsulation solution from the soil matrix can be accomplished by a variety of suitable methods which include, but are not limited to, staged evaporative processes and mechanical water separation techniques.

Separation processes such as those envisioned for use in the process of the present invention need not remove the encapsulation solution in its entirety. In the preferred embodiment of the present invention a portion of the encapsulation solution is retained in the soil after it is returned to a second staging area on the treatment site. Once in place in the soil, the residual encapsulation solution continues to act on any contaminants bonded thereto rendering them susceptible to the decomposition action of aerobic and anaerobic bacteria present or specifically introduced into the soil.

Without being bound to any theory, it is believed that the chemical process which takes place during the contact/mixing interval is one of bioencapsulation. Aromatic compounds such as the target chemical contaminants are attached to the soil matrix by some kind of relatively weak bonding force such as Vanderwall interaction. It is believed that this interaction most probably occurs between the aromatic portion of the chemical contaminant and the soil matrix. Plain water also exhibits a minor degree of affinity to the chemical contaminant materials. However, the interactive force between water and organic compound is so much weaker than that exhibited between the soil matrix and the aromatics that the quantity of organic compounds removed from the soil matrix by plain water does not appreciably lower the soil contaminant level. It is theorized that non-ionic and anionic surfactant materials such as those defined in the present invention, when added to water, increase the solution affinity of the resulting encapsulation material for organic compounds to a level which exceeds that exhibited between the aromatic and the soil matrix.

It is also believed that the non-ionic surfactants employed herein have a hydrophobic portion which actively associates with the organic compounds contained on or in the soil matrix. The hydrophilic portion of the surfactant serves to solubilize the heretofore water insoluble aromatic material to the extent that the surfactant-organic complex can remain suspended in the aqueous medium for an interval sufficient to permit separation of the solution from contact with the soil matrix. Within the purview of this invention, suspension can be in the form of a true solution, an emulsion or a stable suspension.

It has been unexpectedly discovered that aromatic compounds and halogenated hydrocarbons such as those defined herein are rendered susceptible to chemical decomposition when associated with non-ionic surfactants defined herein and encapsulated in the process of the present invention. Without being bound to any theory, it is believed that the bonding and encapsulation of the hydrocarbon contaminants which occur in the process of the present invention renders the compounds more susceptible to naturally occurring biochemical, mechanical and physical degradative processes such as would occur by microbial action, ultraviolet radiation, exposure to elevated temperature levels, fluctuations in ambient temperature and the like. It is believed that the interaction bonding process which is exhibited between the surfactant and the chemical contaminants is an affirmative biochemical encapsulation in which carbon-carbon bonds present in the chemical contaminant compound are abruptly broken thereby increasing the water solubility of the resulting molecule and rendering more susceptible to further breakdown.

Thus, the process of the present invention provides a method whereby large quantities of chemical contaminants can be removed from the contaminated soil matrix through the introduction of encapsulation solution mixing and separation steps. The initial steps of the process of the present invention, provides reduction in chemical contaminant levels sufficient to stabilize the soil matrix against further contaminant leaching or migration. The residual encapsulation solution remaining in the soil matrix after processing is completed provides a material to which any residual contaminant can bond rendering the contaminant amenable to action by aerobic and anaerobic bacteria, present or purposely introduced into the soil matrix.

The concentration of non-ionic and anionic surfactants as present in the encapsulation solution can be varied depending upon the contamination level and general condition of the soil matrix. In the preferred embodiment, concentration of the anionic surfactant and cellosolve diluent will vary in a one-to-one relationship with the non-ionic surfactant concentration. In order to determine the appropriate concentration of non-ionic surfactant in the encapsulation solution for a particular application, the process of the present invention preferably includes a calibration procedure to provide suitable analytical data on which to base calculations of the appropriate concentration range for the non-ionic surfactant in the encapsulation solution. In the calibration procedure of the process of the present invention at least one representative sample of the contaminated soil matrix is obtained.

The representative soil sample may be obtained by any suitable, reliable reproducible method. In the preferred embodiment, a sample or series of samples are obtained by the method outlined in Michigan Public Act Number 478 of 1988 as amended by Public Act Number 150 of 1989. These samples are analyzed by conventional methods to determine the area of greatest chemical contamination within the defined site. Suitable methods are defined in EPA Method 3540 and 8270.

The exact weight of the samples tested can be any amount which will provide sufficient levels of extracted chemical contaminant for accurate analysis by any of a variety of known and accepted analytical procedures. Examples of these procedures include infrared analysis, gas chromatography, mass spectroscopy, gas chromatograph/mass spectroscopy and the like. In general relatively small samples sizes can be employed. In the preferred embodiment, sample sizes between about 5 and about 25 grams can be employed.

Once the maximum contaminant concentration of the soil has been determined, the concentration of the encapsulation solution can be calibrated against this standard. To accomplish this, a calibration sample can be treated in a series of preliminary bench top runs to determine the effectiveness of the given concentration of the encapsulation solution. The calibration sample is washed with a test encapsulation solution having an initial concentration of non-ionic surfactant equal to [S].

Figure 2:
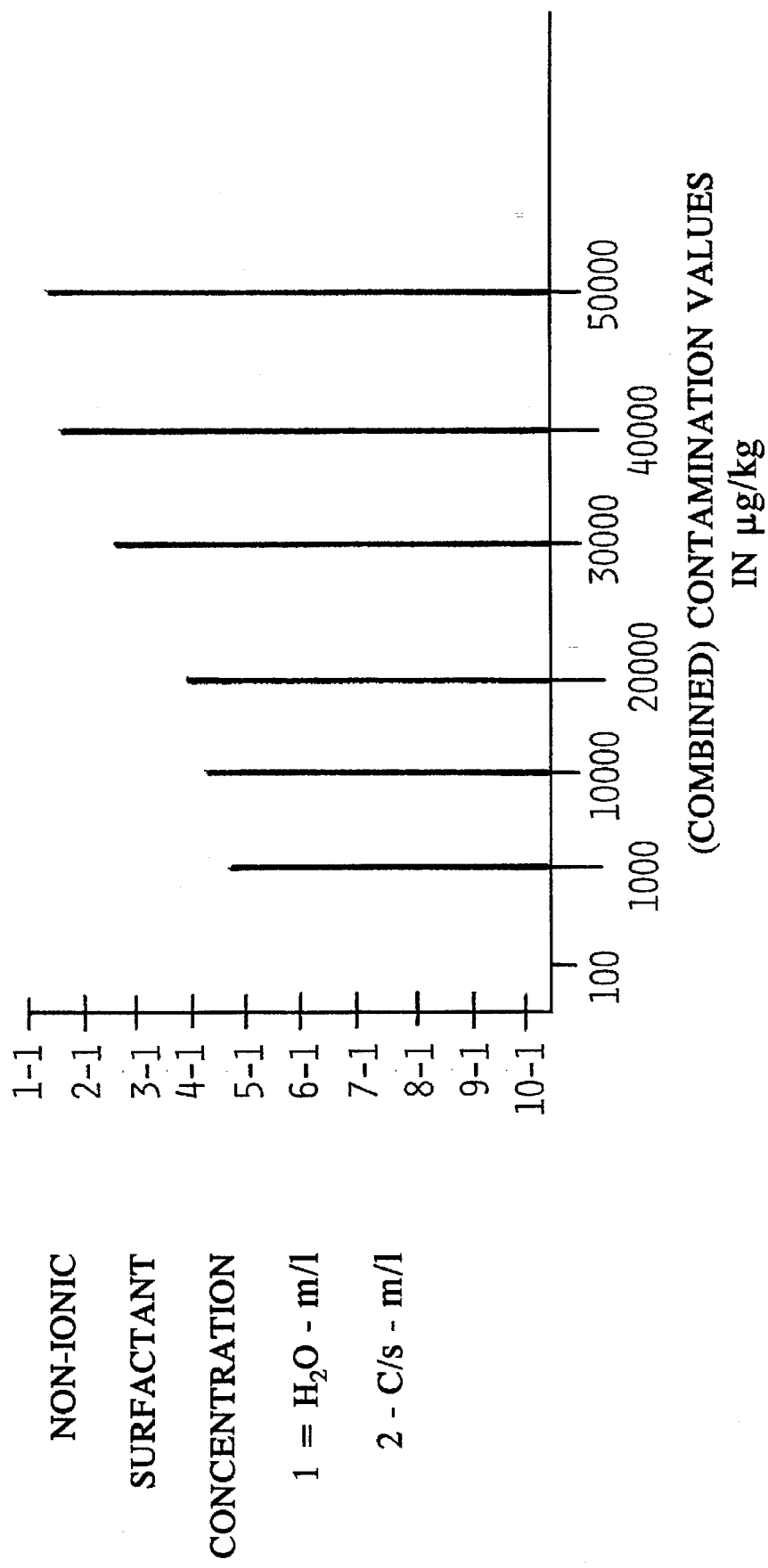
FIG. 2 is a graphic representation of the relationship between contaminant concentration and concentration of surfactant in calibration use solution standard.

The value [S] is graphically represented in FIG. 2. The value [S] is derived from the relationship between contaminant concentration in the soil matrix and the concentration of non-ionic surfactant necessary to obtain complete closure. The combined contaminant concentration is experimentally derived. In general, the concentration of non-ionic surfactant employed to obtain complete closure is that amount necessary to reduce the concentration of target chemical contamination below detection limits in 90% of the samples tested.

Once the value [S] is determined, the efficacy of the initial non-ionic surfactant concentration value can be experimentally verified in the following manner.

In the calibration procedure of the present invention, the initial calibration sample is washed with encapsulation solution containing a concentration of non-ionic surfactant equal to [S] while being mechanically agitated in a manner which ensures intimate contact between the washing encapsulation solution and the soil matrix. For bench scale operations, this agitation can be supplied by a rotary mixer. Mixing and contact continue for an interval which is sufficient to permit association of the chemical contaminants heretofore entrained in the soil matrix with the non-ionic surfactant and to approximate field conditions. In general the interval in which the calibration sample is saturated with encapsulation solution is between about 1 and about 20 minutes; with an interval between about 5 and about 10 minutes being preferred.

The resulting encapsulation solution wash is then removed from contact with the soil sample by any suitable means such as rotary vacuum evaporation. The soil sample is then extracted with a suitable solvent in the manner described previously to preferentially extract any targeted chemical contaminants remaining on the soil matrix after treatment.

The resulting extract is then prepared and analyzed by a suitable method as defined in accepted analytical literature to determine the effectiveness of the treatment method. If complete closure has been obtained i.e. the chemical contamination level has been reduced to an acceptable predetermined level; either that non-ionic surfactant concentration level can be employed as a standard to formulate an effective use solution or the non-ionic surfactant concentration can be literally reduced and tested on further calibration samples to obtain the optimum concentration level for use in the effective treatment level.

Where unacceptable levels of contamination are still evident after initial treatment of the calibration sample, the level of non-ionic surfactant in the encapsulation is incrementally increased in relationship with the excess contaminant concentration to provide a modified encapsulation solution with a level of surfactant effective to treat the given soil matrix. While this iterative variation can occur in a hit or miss fashion, it has been found that it is most advantageous to interactively increase or decrease the concentration of non-ionic surfactant in increments between about 0.2 and about 1.0% by volume until an optimally effective encapsulation solution is obtained. In the preferred embodiment the increments are about 0.5 vol. %

To further illustrate the process of the present invention, attention is directed to the following Examples. The Examples are included for illustrative purposes and are not to be construed as limitative of the present invention.

EXAMPLE I

In order to determine the initial level of chemical contaminant present in a soil matrix obtained from an industrial site in Western Michigan, a 10.10 gram sample was extracted and analyzed for the presence of polynucleated aromatics following the procedures outlined in EPA Test Method 3540 and EPA Analytical Method 8270 using Methylene Chloride as the extraction solvent. The results are listed in Table III.

EXAMPLE II

A second sample of soil matrix weighing 10.2 grams was obtained from the Western Michigan Industrial site discussed in Example I. The sample was treated by the process of the present invention as outlined.

An encapsulation solution as defined in the present invention was prepared by the admixture of 2 parts deionized water to 1 part CONTROL SOLVE 228 commercially available from S&S Company of Georgia, Albany, Ga. to make 25 ml of encapsulation solution having a non-ionic surfactant concentration of 2.0% by volume. The encapsulation solution was then admixed with the soil sample and agitated in a closed vessel by rapid shaking for an interval of two minutes.

The encapsulation solution was, then, separated from the soil by vacuum filtration. The soil sample was, then, dried, by admixture with sodium sulfate in preparation for subsequent analytical procedures. The sample was, then, prepared by the process outlined in EPA Method 3540 and the resulting extract analyzed by the EPA method for analysis of aromatic hydrocarbons (EPA Method 8260: SW-846). The results are set forth in Table III.

As can be seen by the results set forth, the procedure achieved significant reduction in the contaminant concentration in the soil matrix.

EXAMPLE III

A third sample of soil matrix weighing 10.2 grams was obtained from the Western Michigan Industrial site discussed in Example I. The sample was treated with an encapsulation solution prepared in the manner outlined in Example II to contain 2.5% by volume surfactant. The method of soil treatment is outlined in Example II.

The results of the treatment were obtained by the analytical method outlined in Example II and are set forth in Table III.

As can be seen from these results, effective closure has been obtained.

EXAMPLE IV

A 600 cubic yard sample of soil matrix weighing approximately 900 tons or 914,442.3 kg is obtained from the Western Michigan Industrial site. The soil is continuously introduced into a Midland Mix-Trailer Pug Milling device Model Number T-4100, commercially available from Midland Asphalt Corporation of Victor, N.Y. at a rate sufficient to process the total sample in one hour. Encapsulation solution prepared as outlined in Example III is introduced into contact with the soil as it enters the mixing chamber.

The amount of encapsulation solution introduced is sufficient to thoroughly saturate the soil sample (approximately 36,226 gallons).

After a mixing interval of 1.5 minutes, the encapsulation solution is removed from the soil sample by mechanical screening. The processed soil is analyzed for target aromatic contaminants by routine EPA methods. No detectable levels of contaminants are found.

TABLE III

Chemical Contaminant Assay

| Compound | Concentration (ppb) | | |
|---|---|---|---|
| | Prior to Treatment | After 1st Iteration | After 2nd Iteration |
| Naphthalene | 4003.1 | 404.2 | BDL |
| Acenaphthalene | BDL | BDL | BDL |
| Acenapthene | BDL | BDL | BDL |
| Fluorene | 4974.5 | BDL | BDL |
| Phenanthrene | 6430.6 | BDL | BDL |
| Anthracene | BDL | BDL | BDL |
| Fluoranthene | 5854.3 | BDL | BDL |
| Pyrene | BDL | BDL | BDL |
| Benz(a)anthracene | BDL | BDL | BDL |
| Chrysene | BDL | BDL | BDL |
| Benzo(b)fluoranthene | BDL | BDL | BDL |
| Benzo(k)fluoranthene | BDL | BDL | BDL |
| Benzo(a)pyrene | BDL | BDL | BDL |
| Indeno[1,2,3-c,d]pyrene | BDL | BDL | BDL |
| Dibenz(a,h)anthracene | BDL | BDL | BDL |
| Benzo(g,h,i)perylene | BDL | BDL | BDL |

BDL - Below Detection Limits (less than 330 ppb)

EXAMPLE V

In order to determine the initial level of chemical contaminants present in a soil matrix obtained from a second industrial site in Western Michigan in which the soil was contaminated with gasoline, a 10.2 gram sample was extracted and analyzed for the presence of polynucleated aromatics following the procedures outlined in EPA Test Method and EPA Analytical Method using methylene chloride as the extraction solvent. The results are listed in Table IV.

EXAMPLE VI

A second sample of soil matrix weighing 10.3 grams was obtained from the second industrial site discussed in Example V. The sample was treated by the process of the present invention as outlined.

An encapsulation solution as defined in the present invention was prepared by the admixture of 2 parts deionized water to 1 part of an admixture containing 35% by volume isopropylamine dodecylbenzene sulfonate; 35% by volume cocamidopropyl betaine; 5% by volume branched nonyl phenoxypoly (ethyleneoxy) ethanol; 10% by volume butyl cellosolve and 15% by volume water to make 25 ml of encapsulation solution. The encapsulation solution was then admixed with the soil sample and agitated in a closed vessel by rapid shaking for an interval of two minutes.

The encapsulation solution was, then, separated from the soil sample by vacuum filtration. The soil sample was, then, dried by admixture with sodium sulfate in preparation for subsequent analytical procedures. The sample was, then, prepared by the process outlined in EPA EPA-SW846-1118.1 and the resulting extract analyzed for the presence of aromatic hydrocarbons (EPA Methods 8015; 8020; and 8210). The results are set forth in Table IV.

As can be seen by the results set forth, the procedure achieved significant reduction in contaminant concentration in the soil matrix.

TABLE IV

CHEMICAL CONTAMINANT ASSAY

| COMPOUND | CONCENTRATION µg/kg | | Detection Limit µg/kg |
|---|---|---|---|
| | Prior to Treatment | After Treatment | |
| Benzene | 13,450 | 25 | 10 |
| Toluene | 26,420 | 47 | 10 |
| Ethylbenzene | 27,210 | 490 | 10 |
| Xylenes | 117,930 | 640 | 10 |

EXAMPLE VII

In order to compare the effect of water washing and treatment with the anionic/non-ionic encapsulation solution on contaminated soil, a composite sample from the second industrial site discussed in Example V was obtained. Three samples were prepared for this composite.

The first sample was analyzed according to the method outlined in EPA SW 846:8020 for the presence and concentration of benzene, toluene, ethylbenzene and xylenes. The results are outlined in Table V.

The second sample, weighing 10.1 grams, was washed with 25 ml deionized water according to the process outlined in Example VI. The wash water was separated from the soil sample by vacuum filtration. The soil sample was, then, dried by admixture with sodium sulfate and analyzed for the presence of chemical contaminants by the method outlined in SW-846:8020. The results are outlined in Table V.

The third sample, weighing 10.2 grams was washed with 25 ml encapsulation solution prepared as in Example VI, in the manner outlined therein. After a two minute agitation interval, the encapsulation solution was separated from the soil sample by vacuum filtration. The sample was, then, prepared and analyzed in the manner outlined in Example VI. The results are outlined in Table V.

As can be observed, treatment with the anionic/non-ionic surfactant encapsulation solution of the present invention significantly increased the total amount of organic contaminants removed from the soil matrix.

TABLE V

COMPARISON IN CONTAMINANT REDUCTION BETWEEN WATER WASH AND TREATMENT BY PROCESS OF PRESENT INVENTION

| CONTAMINANT | UNTREATED µg/kg | WATER WASH µg/kg | TREATED µg/kg |
|---|---|---|---|
| Benzene | 13450 | 8430 | 26 |
| Toluene | 26420 | 16340 | 47 |
| Ethylbenzene | 27210 | 17950 | 490 |
| Xylenes | 117930 | NA | 640 |

EXAMPLE VIII

The effectiveness of the method and composition outlined in Example VI in treating soil contaminated with polychlorinated biphenyls (PCB) was ascertained by treating three soil samples contaminated by oil containing PCB's in the manner outlined in Example VI. Initial and post-treatment PCB concentration was determined by the method outlined in SW-846:8080 revised. The results are set forth in Table VI. As can be seen, all samples showed dramatic decrease in TPH and PCB concentration in treated soil.

TABLE VI

EFFECT OF TREATMENT ON SAMPLES CONTAINING PCB AND TPH

| SAMPLE NUMBER | INITIAL CONTAMINANT CONCENTRATION (mg/KG) | | FINAL CONTAMINANT CONCENTRATION (mg/kg) | |
|---|---|---|---|---|
| | TPC | PCB | TPH | PCB |
| 1 | 1486 | 73 | 12 | 0.52 |
| 2 | 753 | 45 | 3 | 0.18 |
| 3 | 248 | 19 | 2 | 0.11 |

While the invention has been described in connection with what is presently considered to be the most practical and preferred embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures.

What is claimed is:

1. A process for treating a process stream containing a chemical contaminant at a first concentration level which comprises:

introducing an aqueous encapsulation solution into contact with the process stream, said encapsulation solution consisting essentially of a non-ionic surfactant material, an anionic surfactant material, and water;

allowing said encapsulation solution to remain in contact with said process stream for an interval sufficient to reduce chemical contaminant from a first concentration level to a second concentration level, said second concentration level lower than said first concentration level;

removing a major portion of said encapsulation solution which has been previously introduced from contact with said process stream after said second concentration level has been attained;

wherein said anionic surfactant material is present in said encapsulation solution in an amount between about 2.0 and about 40.0% by total composition volume, said anionic surfactant material selected from the group consisting of ethoxylated linear alcohols, alkyl benzene sulfonates, alkyl aryl sulfonates, naphthalene sulfonates, alpha olefin sulfonates, and mixtures thereof.

2. The process of claim 1 wherein the non-ionic surfactant in the said encapsulation solution is present in an amount between about 1.0 and about 10.0% by total composition volume and is selected from the group consisting of polyoxyethylene adducts of tall oil, polyoxyethylene adducts of rosin acid, polyoxyethylene adducts of stearic acid, polyoxyethylene adducts of oleic acid, polyoxyethylene adducts of fatty acid amines derived from cashew oil, polyoxyethylene adducts of fatty acid amines derived from almond oil, and mixtures thereof wherein said non-ionic surfactant material has an HLB between about 3.5 and about 13.5.

3. The process of claim 2 wherein said encapsulation solution further contains:

a plant-derived organo-alkaloid complex selected from the group consisting of amidoalkyl betaines having between 2 and 30 carbon atoms having alkyl groups, said organo-alkaloid being present in an amount between about 0.01 and about 30.0% of the total volume of the encapsulation solution;

solvent solubilizer selected from the group consisting of butyl cellosolve, methyl cellosolve, ethyl cellosolve, and mixtures thereof, said solvent solubilizer present in an amount between about 3.0 and about 5.0% of the total volume of the encapsulation solution.

4. The process of claim 3 which further comprises:

prior to contacting said process stream with said encapsulation solution, ascertaining an amount of said non-ionic surfactant present in said encapsulation solution sufficient to obtain reduction of chemical contaminant from said first concentration level.

5. The process of claim 4 wherein ascertaining said effective amount of said non-ionic surfactant present in said encapsulation solution necessary to obtain reduction of chemical contaminant further comprises:

reacting a sample of said process stream with a measured quantity of a test solution consisting essentially of said encapsulation solution, said test solution containing between about 1.0 and about 2.5% non-ionic surfactant per total composition volume;

ascertaining treatment effectiveness of said test solution; and varying concentration of said non-ionic surfactant by incremental values between about 10% and about 20% and repeating said reaction step until a predetermined level of effectiveness has been achieved.

6. The process of claim 4 wherein the chemical contaminant is an organic compound selected from the group consisting of naphthalene, acenapthalene, acenapthene, fluorene, phenanthrene, anthracene, fluoranthene, pyrene, benz(a)anthracene, chrysene, benzo(b)fluoranthene, benzo (k)fluoranthene, benzo(a)pyrene, indeno(1,2,3-c,d)pyrene, dibenz(a,h)anthracene, benzo(g,h,i)perylene, benzene, toluene, ethylbenzene, xylenes, dichlorobenzene, chlorodifluoro methane, 1,1,2 tetrafluorethane and mixtures thereof.

7. The process of claim 4 wherein the chemical contaminant is an organic compound selected from the group consisting of trichloroethylene, 1,1,1 trichloroethane, chloroform, methylene chloride, 1,1, dichloroethane, 1,3 dichloropropane, and mixtures thereof.

8. A process for reducing chemical contamination in a fluidizable matrix from a first concentration level of chemical contaminants to a second concentration level of chemical contaminants, said second concentration level lower than said first concentration level which comprises:

introducing an encapsulation solution into contact with the fluidizable matrix containing said chemical contaminants, said encapsulation solution introduced in an amount sufficient to form a saturated matrix/encapsulation solution admixture, said encapsulation solution consisting essentially of a non-ionic surfactant material, an anionic sequestering agent, an organo-alkaloid, an alcohol dispersing agent, and water; and agitating said admixture for an interval sufficient to permit said chemical contaminants to preferentially dissociate from contact with said matrix in favor of association with said encapsulation solution and to permit severance of at least one carbon chemical bond in said chemical contaminant thereby reducing concentration of said chemical contaminants from said first concentration level to said second concentration level.

9. The process of claim 8 further comprising:
removing at least a portion of said encapsulation solution from contact with said matrix after agitation of said admixture.

10. The process of claim 9 wherein removal of said encapsulation solution is accomplished by evaporation.

11. The process of claim 9 wherein removal of said encapsulation solution is accomplished by mechanical water separation.

12. The process of claim 8 which further comprises:
after agitating said admixture, subjecting said chemical contaminants to additional chemical decomposition to preferentially allow further expedited naturally occurring degradative processes to proceed.

13. The process of claim 8 further comprising the step of ascertaining an effective concentration of said non-ionic surfactant present in said encapsulation solution necessary to reduce chemical contaminants in the fluidizable matrix from the first concentration level to the second concentration level prior to introducing said encapsulation solution into contact with said matrix.

14. The process of claim 13 wherein determining said non-ionic surfactant concentration further comprises:
washing a sample of the matrix with a measured quantity of encapsulation test solution to obtain an encapsulation wash anylant, said encapsulation test solution consisting essentially of between about 1.0 and about 2.5% by volume non-ionic surfactant in water;
ascertaining effectiveness of said encapsulation solution washing in removing essentially target chemical contaminants; and
varying concentration of said non-ionic surfactant upward by incremental values of between about 10% and about 20% and repeating encapsulation solution washing on additional samples of said matrix until said target chemical contaminants are present at below a predetermined desired concentration level.

15. The process of claim 8 wherein said target chemical contaminant is an organic compound selected from the group consisting of naphthalene, acenapthalene, acenapthene, fluorene, phenanthrene, anthracene, fluoranthene, pyrene, benz(a)anthracene, chrysene, benzo(b) fluoranthene, benzo(k)fluoranthene, benzo(a)pyrene, indeno (1,2,3-cd) pyrene, dibenz(a,h)anthracene, benzo(g,h,i) perylene, benzene, toluene, ethylbenzene, xylenes, dichlorobenzene, chlorodifluoro methane, 1,1,2 tetrafluorethane and mixtures thereof.

16. The process of claim 8 wherein said matrix is processed at a rate between about 200 and about 1500 cubic yards per hour.

17. The process of claim 8 wherein the fluidizable matrix is soil and wherein introducing of said fluidizable matrix encapsulation solution into contact with the said fluidizable matrix and agitating of said matrix/encapsulation solution admixture occurs in a milling device having a plurality of counter-rotating mixing blades and said matrix is processed at a rate up to approximately 600 cubic yards per hour.

18. The process of claim 8 wherein said fluidizable matrix comprises a process stream containing a chemical contaminant.

19. The process of claim 8 wherein said fluidizable matrix comprises a fluidizable soil matrix.

20. The precess of claim 8 wherein the chemical contaminant is an organic compound selected from the group consisting of trichloroethylene, 1,1,1 trichloroethane, chloroform, methylene chloride, 1,1 dichloroethane, 1,3 dichloropropane and mixtures thereof.

21. A process for reducing chemical contamination in a fluidizable chemically contaminated soil matrix which comprises:
introducing an encapsulation solution into contact with the fluidizable chemically contaminated soil matrix, said encapsulation solution introduced in an amount sufficient to form a saturated admixture with the soil matrix, said encapsulation solution preferentially exhibiting attraction with respect to chemical contaminants contained in the soil matrix, said encapsulation solution consisting essentially of non-ionic surfactant material, an anionic surfactant material, an alcohol dispersing agent, an organo-alkaloid and water;
mechanically agitating said admixture for an interval sufficient to permit said chemical contaminants to preferentially dissociate from contact with the soil matrix to form a dissociated chemical contaminant and sufficient to initiate severance of at least one carbon bond in said dissociated chemical contaminant; and
removing a major portion of said encapsulation solution from contact with the soil matrix.

22. The process of claim 21 which further comprises ascertaining an amount of said non-ionic surfactant present in said encapsulation solution necessary to permit severance of at least one carbon bond in chemical contaminant preferentially dissociate said chemical contaminants from contact with the soil matrix, said ascertaining of said amount of non-ionic surfactant comprising:
washing a sample of the matrix with a measured quantity of encapsulation test solution to obtain an encapsulation wash anylant, said encapsulation test solution consisting essentially of between about 1.0 and about 2.5% by volume non-ionic surfactant in water;
ascertaining effectiveness of said washing washing of said sample of said matrix with a measured quantity of encapsulation test solution to obtain said encapsulation test anylant in removing chemical contaminants; and
varying concentration of said non-ionic surfactant upward by incremental values of between about 10% and about 20% and repeating said washing with said measured quantity of encapsulation on additional test solution samples of said matrix until said chemical contaminants are present at below a predetermined concentration level.

23. The process of claim 21 wherein the said encapsulation solution consists essentially of:
between about 1.0 and about 10.0% by total composition volume of a non-ionic surfactant selected from the group consisting of polyoxyethylene adducts of tall oil, polyoxyethylene adducts of rosin acid, polyoxyethylene adducts of stearic acid, polyoxyethylene adducts of oleic acid, polyoxyethylene adducts of fatty acid amines derived from cashew oil, polyoxyethylene adducts of fatty acid amines derived from almond oil, and mixtures thereof wherein said non-ionic surfactant material has an HLB between about 3.5 and about 13.5;
between about 2.0 and about 10.0% by total composition volume of an anionic surfactant sequestering agent selected from the group consisting of ethoxylated linear alcohols, alkyl benzene sulfonates, alkyl aryl sulfonates, naphthalene sulfonates, alpha olefin sulfonates, and mixtures thereof; and water.

24. The process of claim 23 wherein said encapsulation solution further contains:

a plant-derived organo-alkaloid complex selected from the group consisting of amidoalkyl betaines having between 2 and 30 carbon atoms present in the alkyl group, said organo-alkaloid being present in an amount between about 5.0 and about 40.0% of the total volume of the encapsulation solution;

an ethoxy alcohol selected from the group consisting of butyl cellosolve, ethyl cellosolve, methyl cellosolve, and mixtures thereof, said alcohol present in an amount between about 5 and about 30.0% of the total volume of the encapsulation solution.

* * * * *